(12) United States Patent
Kim et al.

(10) Patent No.: US 10,899,310 B2
(45) Date of Patent: Jan. 26, 2021

(54) ADAS-LINKED ACTIVE HOOD APPARATUS FOR ALWAYS-ON OPERATION

(71) Applicants: Hyundai Motor Company, Seoul (KR); Kia Motors Corporation, Seoul (KR)

(72) Inventors: Sang Il Kim, Gyeonggi-do (KR); Eun Cheol Hong, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/434,592

(22) Filed: Jun. 7, 2019

(65) Prior Publication Data
US 2020/0139927 A1 May 7, 2020

(51) Int. Cl.
*B60R 21/38* (2011.01)
*B62D 25/12* (2006.01)
*E05B 77/08* (2014.01)
*B60W 30/095* (2012.01)

(52) U.S. Cl.
CPC .......... *B60R 21/38* (2013.01); *B60W 30/095* (2013.01); *B62D 25/12* (2013.01); *E05B 77/08* (2013.01)

(58) Field of Classification Search
CPC ...... B60R 21/38; B60W 30/095; B62D 25/12; E05B 77/08
See application file for complete search history.

(56) References Cited

U.S. PATENT DOCUMENTS

| | | | | |
|---|---|---|---|---|
| 4,982,993 A | * | 1/1991 | Okazaki | B60S 1/0405 15/250.19 |
| 8,573,658 B2 | * | 11/2013 | Kim | B60R 21/34 292/201 |
| 9,283,925 B2 | * | 3/2016 | Mardi | B60R 21/38 |
| 2020/0108793 A1 | * | 4/2020 | Kim | B60R 21/0134 |
| 2020/0141164 A1 | * | 5/2020 | Kim | B60R 21/013 |

FOREIGN PATENT DOCUMENTS

KR 101510011 B1 4/2015

\* cited by examiner

*Primary Examiner* — Faye M Fleming
(74) *Attorney, Agent, or Firm* — Mintz Levin Cohn Ferris Glovsky and Popeo, P.C.; Peter F. Corless

(57) ABSTRACT

An advanced driving assistance system (ADAS)-linked active hood apparatus for always-on operation is provided. The apparatus includes a rotary arm that is fixed to a hood of a vehicle, a rotary bracket configured to be rotated in conjunction with the rotary arm when rotation force is applied to the rotary bracket and a first link configured to interconnect the rotary bracket and the rotary arm. A motor unit is fixed to a vehicle body and applies rotation force to the rotary bracket. A controller is configured to receive driving information of the vehicle via an advanced driving assistance system (ADAS) and to set a pop-up height of the hood. The controller operates the motor unit to perform pop-up and restoration of the hood to an original position when a collision is expected based on the received driving information.

10 Claims, 4 Drawing Sheets

ADAS-LINKED ACTIVE HOOD APPARATUS FOR ALWAYS-ON OPERATION

CROSS-REFERENCE TO RELATED APPLICATION

This application claims under 35 U.S.C. § 119(a) the benefit of priority to Korean Patent Application No. 10-2018-0132896 filed on Nov. 1, 2018, the entire contents of which are incorporated herein by reference.

BACKGROUND

(a) Technical Field

The present disclosure relates to an advanced driving assistance system (ADAS)-linked active hood apparatus for always-on operation, and more particularly, to a technology related to an active hood that is capable of always being moved upward and restored along with vehicle driving by operating a motor unit to move a rotary bracket coupled to a rotary arm upward based on received ADAS information.

(b) Background Art

With the recent advancement of technology for autonomous vehicles, the field of safety associated with active or passive autonomous driving is in the spotlight. Moreover, an advanced driving assistance system (ADAS) is being developed as a technology for autonomous driving of vehicles.

An ADAS is a high-tech driver assistance system for assisting a driver in driving a vehicle, and is configured to sense a situation ahead of a vehicle, determine the situation based on the sensing result, and control the behavior of the vehicle based on the determined situation. For example, an ADAS sensor device is capable of detecting a foregoing vehicle and driving lanes. Then, when a target lane, a target speed, or a foregoing target is determined, the ADAS controls, for example, electrical stability control (ESC) of a vehicle, an engine management system (EMS), or motor driven power steering (MDPS).

As a representative example, the ADAS may be realized by an automatic parking system, a low-speed urban driving assistance system, or a blind-spot warning system. The ADAS sensor device for sensing a situation ahead of the vehicle may be, for example, a global positioning system (GPS) sensor, a laser scanner, a front radar, or a Lidar, the most representative one being a front camera configured to capture an image of the area ahead of the vehicle.

Furthermore, separate from technology for autonomous driving, recently, an active hood device has been developed as a hood hinge device, which connects opposite side portions of the rear end of a hood, which closes an engine room, to a vehicle body. When a collision with a pedestrian occurs, the active hood device is capable of preventing the pedestrian's head from directly colliding with a rigid vehicle structure such as an engine or a transmission.

In the related art, the active hood device is configured such that the rear end of the hood pops or lifts upward via a disposable active hinge based on an operation of an actuator to secure the safety of a pedestrian during a collision. Even if a vehicle moves using an ADAS as an active autonomous driving system a collision remains possible since a vehicle is unable to avoid a collision object that appears suddenly. Therefore, it is necessary to provide a pedestrian protection device, which pops or ejects a hood upward based on the probability of a collision via the ADAS before an accident occurs. Moreover, the need for an active hood for always-on operation is increasing.

SUMMARY

The present disclosure provides an advanced driving assistance system (ADAS)-linked active hood apparatus for always-on operation in which a controller considers the probability of a collision.

Another object according to the present disclosure is to provide an ADAS-linked active hood apparatus for always-on operation, which includes a motor unit configured to apply rotation force of a rotary bracket coupled to a rotary arm and continuously correct the amount of upward movement (amount of pop-up) of a hood based on driving information received by a controller. A further object according to the present disclosure is to provide an ADAS-linked active hood apparatus for always-on operation in which an active hood, which is operated based on the probability of a collision during autonomous driving.

The objects according to the present disclosure are not limited to the objects as mentioned above, and other unmentioned objects will be understood by those skilled in the art from the following description and will be more clearly appreciated by the embodiments according to the present disclosure. In addition, the object according to the present disclosure may be realized by devices disclosed in the claims and combinations thereof.

The ADAS-linked active hood apparatus for always-on operation for the aforementioned objectives according to the present disclosure may have the following configuration. In an exemplary embodiment, an advanced driving assistance system (ADAS)-linked active hood apparatus for always-on operation may include a rotary arm fixed to a hood of a vehicle, a rotary bracket configured to be rotated in conjunction with the rotary arm when rotation force is applied to the rotary bracket, a first link that interconnects the rotary bracket and the rotary arm, a motor unit fixed to a vehicle body and configured to apply rotation force to the rotary bracket, and a controller configured to receive driving information of the vehicle via an advanced driving assistance system (ADAS) and to set a pop-up height of the hood and to operate the motor unit to perform pop-up and restoration of the hood when a collision is expected based on the received driving information.

In another exemplary embodiment, the controller may be configured to set a rotation amount of the motor unit to adjust an amount of pop-up of the hood based on a position of a collision object, a time-to-collision (TTC), a probability or risk of a collision, and the collision object measured via the ADAS when the collision is expected based on the received driving information. In addition, the controller may be configured to sort the probability of a collision into at least one stage and to set the rotation amount of the motor unit to adjust the amount of pop-up of the hood according to the stage of the probability of a collision. Further, the controller may be configured to set the rotation amount of the motor unit to adjust the amount of pop-up of the hood based on a type of the collision object.

The motor unit may include a motor configured to provide driving force, a motor driving pin configured to transmit rotation force of the motor, and a motor case fixed to the vehicle body and configured to surround the motor. In addition, the motor driving pin may further include a fixing portion configured to apply rotation force to the rotary bracket. The ADAS-linked active hood apparatus for always-on operation may further include a shock absorption member disposed at an intersection between the rotary bracket and the rotary arm.

In another exemplary embodiment, upon receiving driving force through the motor unit, the rotary bracket and the first link may be rotated simultaneously to perform pop-up of the hood. The ADAS-linked active hood apparatus for always-on operation may further include a second link connected to the rotary bracket and the rotary arm. One end of the second link and one end of the rotary bracket may be disposed at a motor driving pin of the motor unit.

BRIEF DESCRIPTION OF THE DRAWINGS

The above and other features according to the present disclosure will now be described in detail with reference to exemplary embodiments thereof illustrated the accompanying drawings which are given hereinbelow by way of illustration only, and thus are not limitative according to the present disclosure, and wherein.

DETAILED DESCRIPTION

Figure 1:
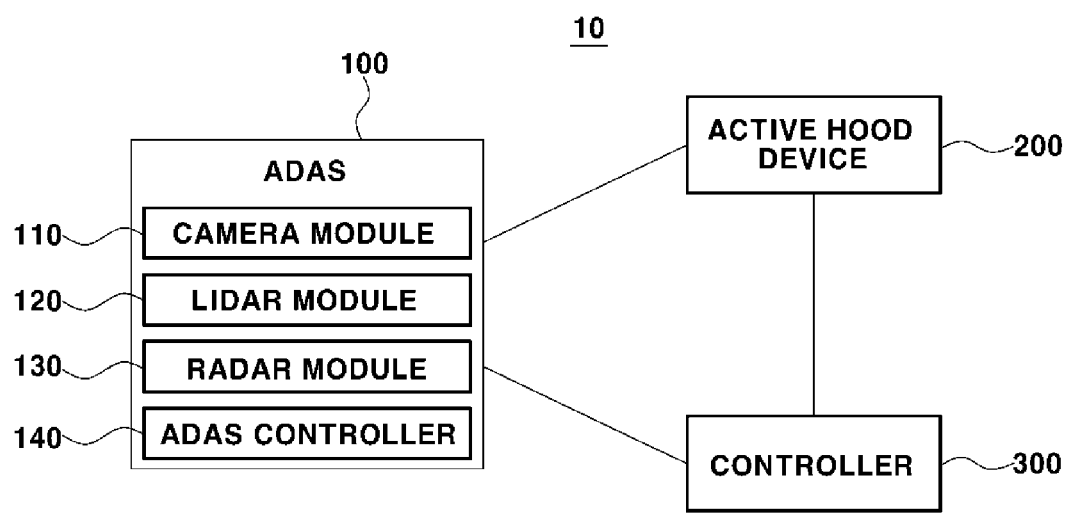
FIG. 1 is a block diagram of an ADAS-linked active hood apparatus for always-on operation according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments according to the present disclosure will be described in more detail with reference to the accompanying drawings. The exemplary embodiments according to the present disclosure may be modified in various forms, and the scope according to the present disclosure should not be interpreted as being limited to the following embodiments. The exemplary embodiments are provided to more completely describe the disclosure to those of ordinary skill in the art.

In addition, in this specification, the upward direction (e.g., height or vertical direction) is the direction in which a hood is moved upward and the downward direction is the direction in which the hood is moved downward (e.g., toward the vehicle body), and the upward and downward directions are relative concepts based on the position of a vehicle. The active hood apparatus disclosed in this specification may be disposed on at least one end of a hood, and may be applied to any of various other positions.

The present disclosure relates to an ADAS-linked active hood apparatus 10 for always-on operation and provides technology to adjust the amount of pop-up of a hood 400 at all times based on a collision risk determination algorithm during autonomous driving by an ADAS 100 or when a driver operates a vehicle based on information received through the ADAS 100. FIG. 1 illustrates the coupling relationship between components of the ADAS-linked active hood apparatus 10 for always-on operation according to the present disclosure. Hereinafter, each component will be described.

The ADAS 100 according to the present disclosure may include a camera 110 (e.g., any type of imaging device), a Lidar 120, and a radar 130, and may be configured to receive vehicle driving information. The ADAS 100 may further include an ADAS controller 140. The ADAS controller 140 may be configured to process vehicle driving information received from the camera, Lidar, and radar and to calculate the probability of a collision (e.g., collision risk) during driving and the time-to-collision (TTC). In another exemplary embodiment according to the present disclosure, an electronic control unit (ECU) may further be provided as a high-ranking vehicle controller (e.g., upper controller). The ECU may be configured to operate the ADAS controller 140 and a pop-up controller 300 for a hood 400.

In the ADAS 100 according to the present disclosure, an image sensor may be configured to sense an image of a subject or object captured via a lens, an image processor may be configured to receive and process data of the captured image from the image sensor, and the camera 110 may be configured to receive the data from the image processor. The camera 110 may be configured to operate the image sensor and the image processor. Examples of such control may include power supply control, reset control, clock (CLK) control, data communication control, power source control, and memory control. The image processor may be configured to process data, which is sensed and output by the image sensor, and examples of this processing may include enlargement of a sensed forward object and focusing on the area of an object in the entire visual-field area.

The Lidar 120 of the ADAS 100 may be connected, for example, to a Lidar device as a sensor. The Lidar device may include a laser transmission module, a laser detection module, a signal collection and processing module, and a data transmission and reception module, and may use a laser source which emits a laser within a wavelength range from about 250 nm to 11 μm or is capable of changing the wavelength of a laser. Such a Lidar device may be divided into a time-of-flight (TOF) type and a phase-shift type according to a signal modulation method.

The Lidar 120 may be configured to operate the Lidar device and any other device connected to the Lidar device (e.g. a Lidar processor (not illustrated) that processes a Lidar sensing output). Examples of this control may include power supply control, reset control, clock (CLK) control, data communication control, and memory control. The Lidar device may be used to sense an area ahead of a vehicle. Accordingly, the Lidar device may be positioned on the front side of a passenger compartment, specifically, under a windshield to transmit and receive a laser through the windshield.

The radar 130 of the ADAS 100 may be connected, for example, to a radar device as a sensor. The radar device may be a sensor configured to measure the distance to an object or the speed or angle of the object using electromagnetic waves. Through the use of the radar device, an object up to about 150 m ahead within a horizontal angular range of about 30 degrees may be sensed using frequency modulation carrier waves (FMCW) or pulse carrier waves. The radar 130 may be configured to operate the radar device and any other device connected to the radar device (e.g. a radar processor (not illustrated) that processes a radar sensing output).

Examples of this control may include power supply control, reset control, clock (CLK) control, data communication control, and memory control. The radar device may typically use a band of about 77 GHz or any other appropriate band, and may be configured to sense an area ahead of the vehicle. The radar processor may be configured to process data sensed and output by the radar device, and examples of this processing may include enlargement of a sensed forward object and focusing on the area of an object in the entire visual-field area.

As described above, the ADAS 100 may include the camera 110, the Lidar 120, and the radar 130, each of which may be configured to process received data, and the processed data may be transmitted to the ADAS controller 140. The ADAS controller 140 may be configured to process vehicle driving information based on the received data, calculate the size and position of a collision object, determine the probability of a collision, and calculate the TTC.

The data processed by the ADAS controller 140 may be transmitted to the ECU as the high-ranking controller, and the ECU may be configured to adjust vertical movement of the rear end of the hood 400 based on the information received from the ADAS 100. In particular, in the case of a front end of the hood 400, a rear end of the hood 400, at which an active hood device 200 is positioned, may be moved upward and downward based on a hood striker (rotation axis of a hood).

Figure 2:
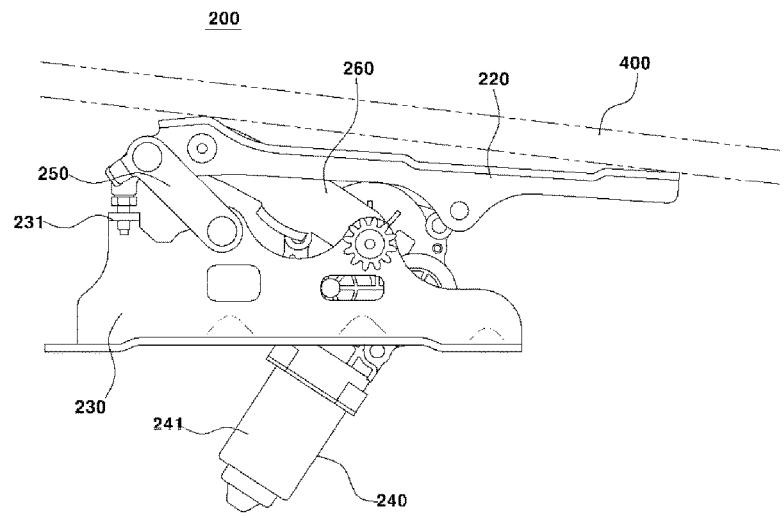
FIG. 2 is a view illustrating the configuration of the ADAS-linked active hood apparatus for always-on operation according to an exemplary embodiment according to the present disclosure.
Figure 3:
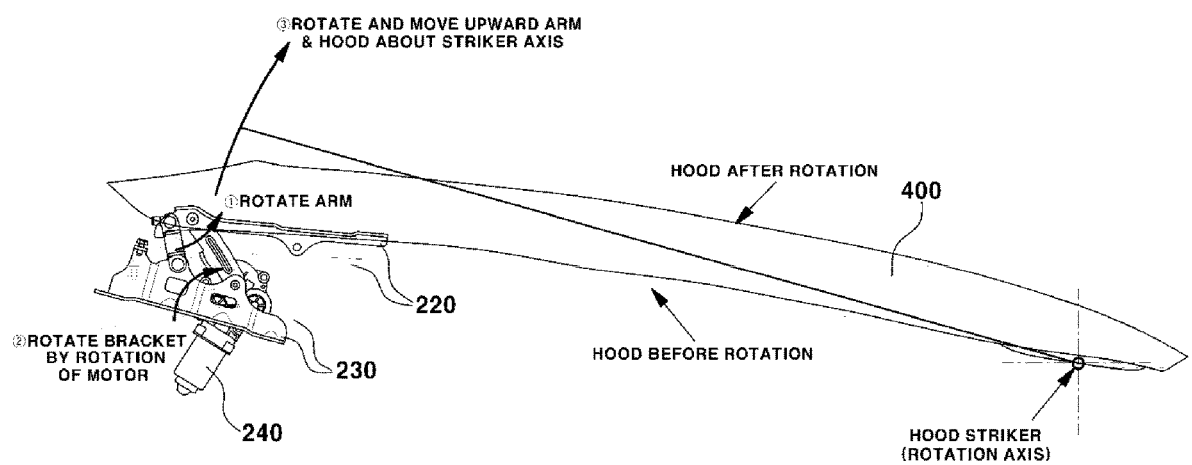
FIG. 3 is a perspective view of a hood that is popped-up in upward and downward directions of a vehicle according to another exemplary embodiment according to the present disclosure.

FIGS. 2 and 3 illustrate the configuration and development of the active hood device 200 according to the present disclosure, which is positioned underside the hood 400 within the vehicle. As illustrated, the active hood device 200 according to the present disclosure may be positioned underside the hood 400, and is configured to adjust the height of one end of the hood 400 disposed thereon via operation of a motor unit 240.

The active hood device 200 may include a rotary arm 220 which is fixed to the hood 400 of a vehicle. In addition, the active hood device 200 may include a rotary bracket 230 which is configured to be rotated in conjunction with the rotary arm 220 when rotation force is applied to the rotary bracket 230 and a first link 250 which interconnects the rotary bracket 230 and the rotary arm 220.

The motor unit 240 may be coupled to a first end of the rotary bracket 230 to apply rotation force to the rotary bracket 230. In addition, the motor unit 240 may include a motor case 242 that surrounds and encloses a motor 241 and may be integrally fixed to a vehicle body and, in detail, may be fixedly coupled to a vehicle fender apron. The rotary bracket 230 may include a shock absorption member 231 at an end thereof, which faces the rotary arm 220, to prepare as procedure in which the hood 400 is restored after pop-up (e.g., restored to an original position).

The rotary bracket 230 may include the first link 250 to be connected to the rotary arm 220 fixed to the hood. Particularly, rotary bracket 230 may be fixed to a motor driving pin 243 to directly receive rotation force applied from the motor unit 240. Accordingly, driving force applied from the motor unit 240 may rotate the rotary bracket 230 in upward and downward directions, and the first link 250 linked to the rotary bracket 230 and the rotary arm 220 connected to the first link 250 may be configured to be rotatably moved in upward and downward directions in conjunction with the motor unit 240.

The motor unit 240 may include the motor 241 and the motor case 242 that surrounds the motor 241 and may include motor driving pin 243 configured to directly apply rotation force to the rotary bracket 230. In addition, the motor 241 may be configured to be operated by the controller 300 according to the present disclosure to receive power from a battery or the like mounted within a vehicle. A second link 260 may be configured to guide a path for rotatably moving the first link 250 upward and may be configured to limit the amount of upward movement of the rotary bracket 230. In particular, according to an exemplary embodiment according to the present disclosure, the second link 260 may be configured to be fixed to one end to which the rotary bracket 230 and the motor unit 240 are coupled.

In the illustrated exemplary embodiment according to the present disclosure, the hood 400 may perform upward movement and, thus, when the motor unit 240 is rotated clockwise, the rotary bracket 230 may be configured to be rotated in the same direction as a moving direction of the motor unit 240, and the first link 250 disposed between the rotary arm 220 and the rotary bracket 230 may be configured to be additionally rotated about one end (e.g., a first end) of the first link 250 while being rotated clockwise. Accordingly, the hood 400 according to the present disclosure may be configured to perform upward pop-up by the motor unit 240 based on the amount of rotation of the rotary bracket 230 and the amount of additional rotation of the first link 250. In addition, the controller 300 may be configured to receive ADAS information and set the amount of pop-up of the hood 400 based on the received ADAS information and, thus, the controller 300 may be configured to adjust power supplied to the motor unit 240 based on a set amount of upward movement of the hood 400.

When a collision does not occur, the controller 300 may be rotated anticlockwise (e.g., toward the rear of a vehicle) to restore the hood 400 to an original position and the rotary bracket 230 which is fixed and connected to the motor unit 240 may be rotated in the same direction as the rotary bracket 230. In addition, the first link 250 and the second link 260 which are connected to the rotary bracket 230 may also be restored to a location proximate to the rotary bracket 230.

The controller 300 according to the present disclosure may be configured to adjust a driving direction of the motor unit 240 to always perform pop-up and restoration of the hood 400. In summary, as illustrated in FIG. 3, when the rotary bracket 230, the first link 250, and the second link 260 are moved upward by a height direction of a vehicle, one end of the hood 400 of a vehicle, which is proximate to a windshield glass, may be popped-up based on a front end of the vehicle (hood striker) as a rotation axis.

The motor unit 240 may be operated by the controller 300. The controller 300 may be configured to adjust an amplitude of power supplied to the motor unit 240 from a battery based on vehicle operation conditions. The controller 300, configured to operate the active hood device 200, may be operated by the ADAS controller 140 or the ECU as the high-ranking controller 300. The vehicle operation conditions may be measured via a plurality of sensor units (not illustrated) mounted within the vehicle. The ADAS controller 140 or the ECU as the high-ranking controller 300 may be configured to receive data regarding the vehicle operation conditions.

The controller 300 may be configured to receive vehicle driving information from the ADAS 100, and apply drive power to the motor unit 240 to adjust the pop-up height of the hood 400 when a collision with an object is expected based on the received driving information. Examples of the received driving information may include the position of a collision object, the time-to-collision (TTC), the probability of a collision, and information about the collision object (e.g. height, size, and movement direction) from the ADAS controller 140. In other words, the speed and position information of the collision object may be detected by the controller to thus calculate a TTC using speed and position information of the vehicle itself.

In the present disclosure, the probability of a collision may be sorted into at least one stage. More specifically, according to an exemplary embodiment according to the present disclosure, the controller 300 may be configured to sort the probability of a collision into three stages to adjust the amount of upward movement (e.g., the amount of pop-up) of the active hood device 200 according to a low stage, a medium stage, and a high stage. In the low stage, the amount of upward movement (e.g., the amount of pop-up) of the hood 400 may be a lowest, and in the medium stage and the high stage, the amount of upward movement (e.g., the amount of pop-up) of the hood 400 may sequentially increase. In addition, in consideration of the fact that the position at which an impact is applied varies according to the height or size of a collision object, the controller 300 may be configured to set the amount of upward movement of the active hood device 200 according to the height of a collision object received from the ADAS 100.

Figure 4:
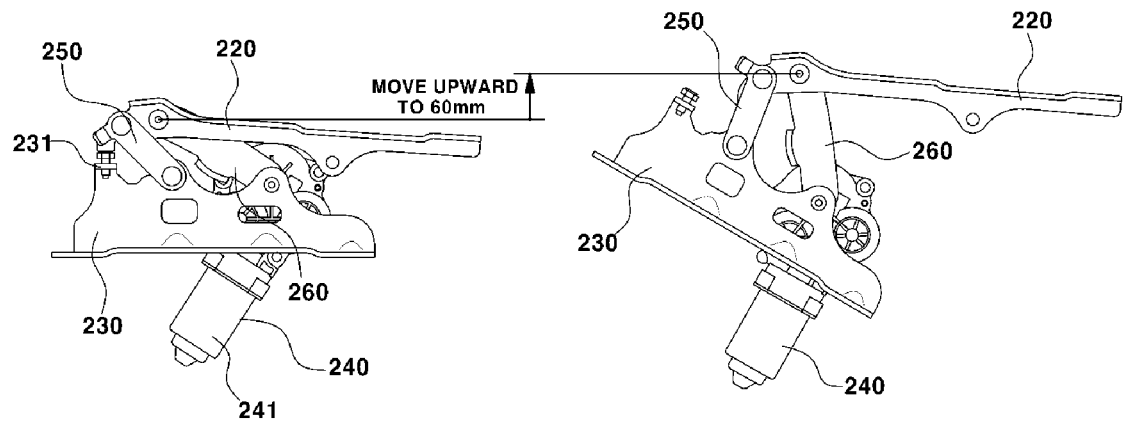
FIG. 4 is a view illustrating the operation of the ADAS-linked active hood apparatus for always-on operation according to an exemplary embodiment of the present disclosure.

FIG. 4 illustrates the upward and downward movement of the active hood device 200 according to an exemplary embodiment according to the present disclosure. As illustrated, the hood 400 according to the present disclosure may be set to be moved upward to about 60 mm in the height direction. Hereinafter, the upward movement mechanism of the active hood device 200 will be described.

Particularly, the controller 300 may be configured to set the pop-up height of the hood 400 based on the probability of a collision, based on the vehicle driving information received from the ADAS 100. The controller 300 may be configured to adjust driving force applied to the motor unit 240 to perform pop-up of the hood 400 and the motor unit 240 that receives the driving force may guide rotation of the rotary bracket 230. In addition, at least one first link 250 and second link 260 connected to the rotary bracket 230 may be configured to be additionally rotated in the same direction as the rotary bracket 230 and, thus, may be configured to be moved in an upward direction of the rotary arm 220. The rotary arm 220 may be fixedly disposed to the hood and, thus, may be configured to be simultaneously rotated by an angle at which the hood 400 is moved upward based on a hood striker.

In summary, when the rotary bracket 230 is rotated and moved up, the first link 250 and the second link 260 may be simultaneously moved upward and, thus, an amount of upward movement of one end of a hood, which faces a windshield, may be adjusted. When the hood 400 is restored to an original position by the controller 300, the rotary bracket 230, the first link 250, and the second link 260 may be moved to a position proximate to a vehicle body by the driving force of the motor unit 240.

The upward movement of the hood 400 may be adjusted by the controller 300. The controller 300 may be configured to receive driving information from the ADAS 100, and calculate the TTC based on the probability of a collision to set the upward movement height of the hood 400. In addition, the controller 300 may be configured to set the amount of pop-up of the hood 400, which is capable of minimizing an impact to be applied to a collision object, according to the size, height, and movement direction of the collision object.

In summary, the controller 300 of the ADAS-linked active hood apparatus 10 for always-on operation according to the present disclosure may be configured to specify a collision object based on driving information measured by the ADAS controller 140, to calculate the TTC based on the probability of a collision, and to set the amount of pop-up of the active hood device 200 according to the acquired conditions. Thus, the active hood device 200 according to the present disclosure does not merely perform pop-up, but may operate at all times to move vertically. When no collision occurs, the rear end of the hood 400 may be moved downward.

Figure 5:
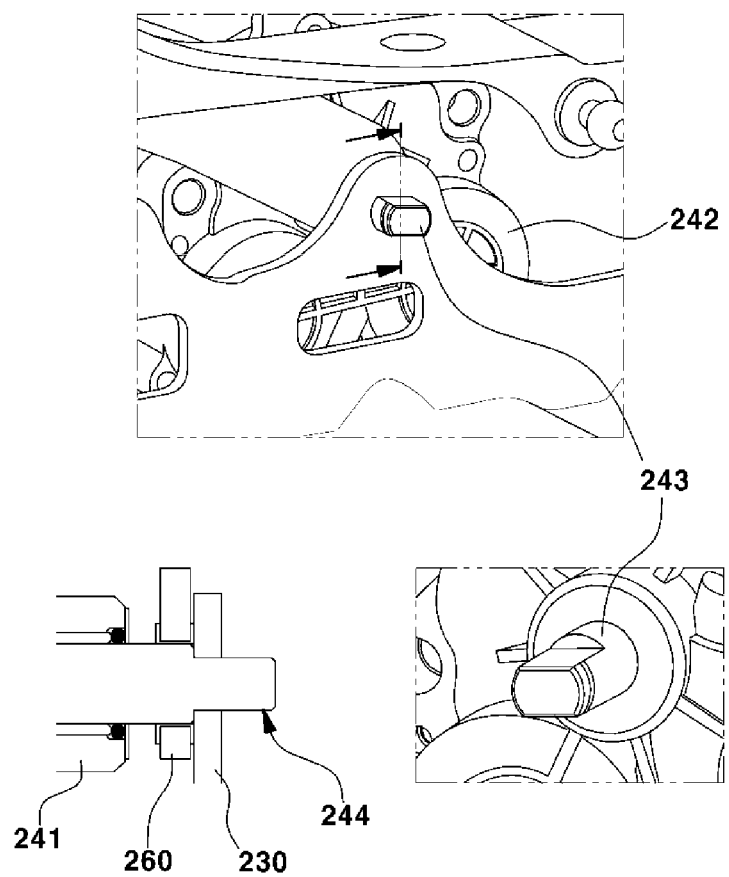
FIG. 5 is a detailed diagram of a motor unit of an ADAS-linked active hood apparatus for always-on operation according to an exemplary embodiment of the present disclosure.

FIG. 5 is a view illustrating a coupling relationship between the rotary bracket 230 and the motor unit 240 according to an exemplary embodiment of the present disclosure. The motor unit 240 that is fixed to a vehicle body and connected to the rotary bracket 230 may include the motor 241, the motor case 242 disposed to surround the motor 241, and the motor driving pin 243 configured to transmit driving force to the rotary bracket 230. The rotary bracket 230 may be fixedly coupled to the motor driving pin 243 and, thus, rotation force generated by the motor 241 may be transmitted directly to the rotary bracket 230. In particular, the motor driving pin 243 may be configured with multi-stages and, thus, the second link 260 and the rotary bracket 230 may each be disposed on the multi-stages of the motor driving pin 243.

An exemplary embodiment of the present disclosure may provide the motor driving pin 243 configured with two stages and, thus, the second link 260 may be disposed on an inner side of the motor driving pin 243 and the rotary bracket 230 may be disposed on an outer side of the motor driving pin 243. In particular, the outer side of the motor driving pin 243, on which the rotary bracket 230 is disposed, may further include a fixing portion 244 to apply rotation force to the rotary bracket 230 and, thus, the fixing portion 244 may include at least one parallel circular end of the motor driving pin 243. Accordingly, the motor driving pin 243 including a fixing pin may transmit driving force applied from the motor 241 directly to the rotary bracket 230, and the second link 260 disposed on the inner side may be configured to be freely rotated based on a position of the rotary arm 220 and the rotary bracket 230.

Figure 6:
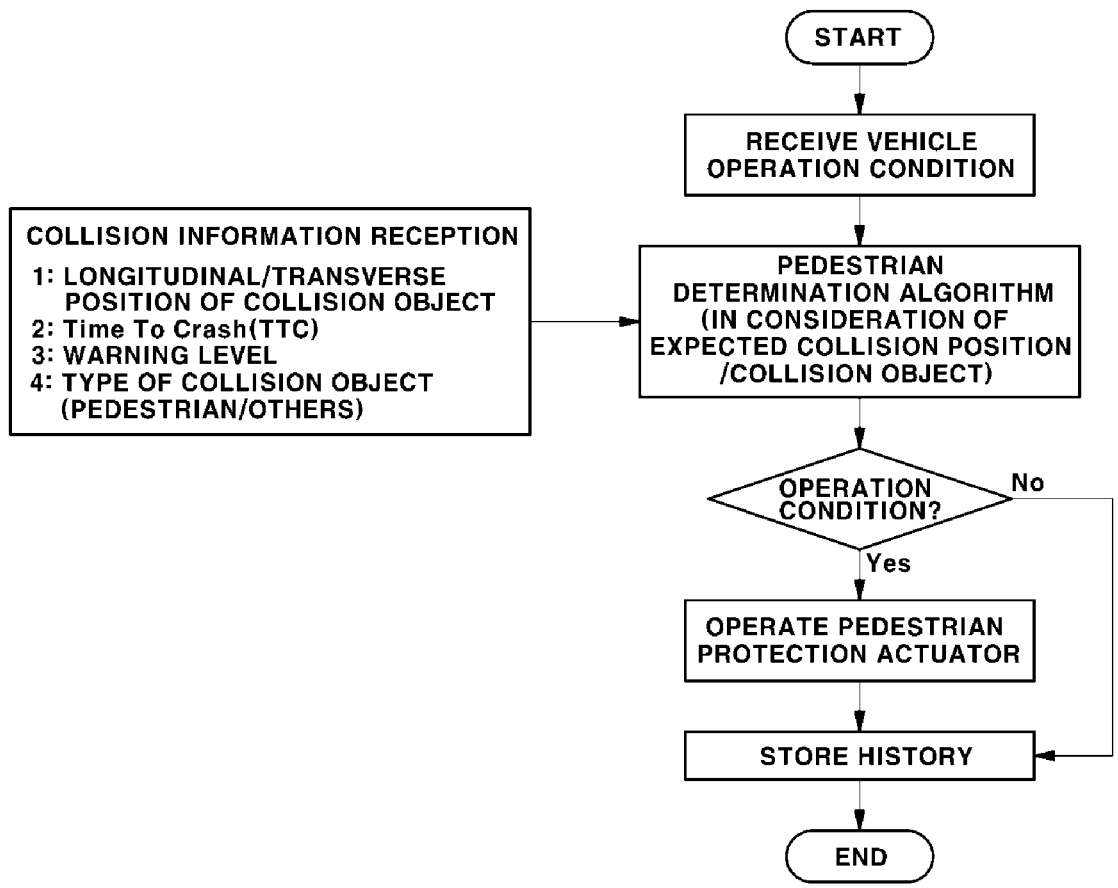
FIG. 6 is a flowchart illustrating an operating method of the ADAS-linked active hood apparatus for always-on operation according to an exemplary embodiment of the present disclosure.

FIG. 6 illustrates the flowchart of information transmitted from the ADAS 100 to the controller 300. As illustrated, the ADAS 100 may include the camera 100, the Lidar 200, the radar 130, and the ADAS controller 140 configured to receive vehicle driving information, and specify the probability of a collision with a pedestrian and a collision object.

The ADAS controller 140 or the controller 300 may be configured to set the probability of a collision to at least one stage, and specify the height and size of a collision object. In addition, the ADAS controller 140 or the controller 300 may be configured to calculate the time-to-collision (TTC) as collision information. The operation condition of the hood 40 may be considered based on the received information. In response to determining that the probability of a collision is greater than a preset value, the active hood device 200 may be operated.

When setting the amount of pop-up of the active hood device 200, the controller 300 may consider the probability of a collision and/or information regarding a collision object. In addition, the controller 300 may be configured to set the amount of pop-up of the active hood device 200 in real time upon receiving information from the ADAS 100. Accordingly, the amount of pop-up of the active hood device 200 may be adjusted according to a change in driving environment.

As is apparent from the above description, the following effects may be obtained by the configuration of the aforementioned components and the coupling relationship and the operation relationship between the components. The present disclosure provides an active hood, which may be connected to and operated by an ADAS. By setting the amount of pop-up of the hood according to operation conditions, it may be possible to secure the safety of a pedestrian when a collision with a vehicle occurs. In addition, it may be possible to provide an active hood for always-on operation by a motor unit for restoring a hood to an original position when collision occurs, rather than an active hood that is able to pop up only once.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An advanced driving assistance system (ADAS)-linked active hood apparatus for always-on operation, comprising:
   a rotary arm fixed to a hood of a vehicle;
   a rotary bracket configured to be rotated in conjunction with the rotary arm when rotation force is applied to the rotary bracket;
   a first link configured to interconnect the rotary bracket and the rotary arm;
   a motor unit fixed to a vehicle body and configured to apply rotation force to the rotary bracket; and
   a controller configured to receive driving information of the vehicle via an advanced driving assistance system (ADAS) and to set a pop-up height of the hood and to operate the motor unit to perform pop-up and restoration of the hood when a collision is expected based on the received driving information.

2. The ADAS-linked active hood apparatus for always-on operation of claim 1, wherein the controller is configured to set a rotation amount of the motor unit to adjust an amount of pop-up of the hood based on a position of a collision object, a time-to-collision (TTC), a probability of a collision, and the collision object measured by the ADAS when the collision is expected based on the received driving information.

3. The ADAS-linked active hood apparatus for always-on operation of claim 2, wherein the controller is configured to sort the probability of a collision into at least one stage and to set the rotation amount of the motor unit to adjust the amount of pop-up of the hood based on the stage of the probability of a collision.

4. The ADAS-linked active hood apparatus for always-on operation of claim 2, wherein the controller is configured to set the rotation amount of the motor unit to adjust the amount of pop-up of the hood based on a type of the collision object.

5. The ADAS-linked active hood apparatus for always-on operation of claim 1, wherein the motor unit includes:
   a motor configured to provide driving force;
   a motor driving pin configured to transmit rotation force of the motor; and
   a motor case fixed to the vehicle body and configured to enclose the motor.

6. The ADAS-linked active hood apparatus for always-on operation of claim 5, wherein the motor driving pin further includes:
   a fixing portion configured to apply rotation force to the rotary bracket.

7. The ADAS-linked active hood apparatus for always-on operation of claim 1, further comprising:
   a shock absorption member disposed at an intersection between the rotary bracket and the rotary arm.

8. The ADAS-linked active hood apparatus for always-on operation of claim 1, wherein, upon receiving driving force through the motor unit, the rotary bracket and the first link are configured to be rotated simultaneously to perform pop-up of the hood.

9. The ADAS-linked active hood apparatus for always-on operation of claim 1, further comprising:
   a second link connected to the rotary bracket and the rotary arm.

10. The ADAS-linked active hood apparatus for always-on operation of claim 9, wherein one end of the second link and one end of the rotary bracket are disposed at a motor driving pin of the motor unit.

\* \* \* \* \*